(12) United States Patent
Shan et al.

(10) Patent No.: US 6,358,486 B1
(45) Date of Patent: Mar. 19, 2002

(54) INORGANIC OXIDES WITH MESOPOROSITY OR COMBINED MESO- AND MICROPOROSITY AND PROCESS FOR THE PREPARATION THEREOF

(75) Inventors: Zhiping Shan; Thomas Maschmeyer; Jacobus C. (Cornelis) Jansen, all of Delft (NL)

(73) Assignee: ABB Lummus Global Inc., Bloomfield, NJ (US)

( * ) Notice: Subject to any disclaimer, the term of this patent is extended or adjusted under 35 U.S.C. 154(b) by 0 days.

(21) Appl. No.: 09/390,276

(22) Filed: Sep. 7, 1999

(30) Foreign Application Priority Data

Sep. 17, 1988 (EP) .............................................. 98203134

(51) Int. Cl.⁷ .......................... C01B 33/20; C01B 33/46
(52) U.S. Cl. ..................... 423/326; 423/329.1; 423/336; 502/240
(58) Field of Search .............................. 423/326, 327.1, 423/327.2, 328.2, 328.1, 328.3, 329.1, 332, 334, 335, 625, 628, 701–707, 336, 337, 338, 339; 502/240

(56) References Cited

U.S. PATENT DOCUMENTS

| | | | |
|---|---|---|---|
| 3,959,174 A | 5/1976 | Winyall et al. ............. | 252/317 |
| 5,057,296 A | 10/1991 | Beck .......................... | 423/277 |
| 5,098,684 A | 3/1992 | Kresge et al. .............. | 423/277 |
| 5,102,643 A | 4/1992 | Kresge et al. .............. | 423/328 |
| 5,538,710 A | 7/1996 | Guo et al. ................... | 423/701 |
| 5,622,684 A | 4/1997 | Pinnavaia et al. .......... | 423/702 |
| 5,672,556 A | 9/1997 | Pinnavaia et al. ............ | 502/63 |
| 5,795,555 A | 8/1998 | Alive et al. ................. | 423/326 |
| 5,849,258 A | 12/1998 | Lujano et al. .............. | 423/700 |

OTHER PUBLICATIONS

Attard, et al., "Liquid–crystalline phases as templates for the snythesis of mesoporous silica", *Nature*, vol. 378, pp. 366–368, (Nov. 23, 1995).

*Primary Examiner*—Steven P. Griffin
*Assistant Examiner*—Maribel Medina-Sanabria
(74) *Attorney, Agent, or Firm*—Elliot M. Olstein; Raymond J. Lillie

(57) ABSTRACT

Bimodal amorphous inorganic material that in a pore size distribution plot has distinct mesopore and micropore peaks. A process for producing a bimodal material or a material that contains essentially only mesopores involves heating an inorganic oxide in the presence of material that bonds to the inorganic oxide by hydrogen bonding.

33 Claims, 11 Drawing Sheets

Example 1

Figure 1B: BJH Desorption dV/dlogD curve for the sample prepared according to example 1.

Figure 1C: Horvath-Kawazoe differential pore volume plot with slit pore geometry for the sample prepared according to example 1.

Figure 2B: BJH Desorption dV/dlogD curve for the sample prepared according to example 2.

Figure 2C: Horvath-Kawazoe differential pore volume plot with slit pore geometry for the sample prepared according to example 2.

Figure 3B: BJH Desorption dV/dlogD curve for the sample prepared according to example 3.

Figure 3C: Horvath-Kawazoe differential pore volume plot with slit pore geometry for the sample prepared according to example 3.

Figure 5B: BJH Desorption dV/dlogD curve for the sample prepared according to example 5.

Figure 5C: Horvath-Kawazoe differential pore volume plot with slit pore geometry for the sample prepared according to example 5.

INORGANIC OXIDES WITH MESOPOROSITY OR COMBINED MESO- AND MICROPOROSITY AND PROCESS FOR THE PREPARATION THEREOF

The invention is directed to inorganic oxide materials having mesopores as well as micropores, or mesopores with a reduced amount of micropores or micropores with a reduced amount of mesopores and to a process for the preparation thereof.

Zeolites and related materials possess well-arranged pore systems and display uniform pore sizes. However, these materials tend to possess either only micro- or only meso-pores. Furthermore these materials are rather expensive to produce.

There is a need for inorganic materials and in particular catalytic materials (or catalytic supports) that include both meso- and micro-pores.

There is also a need for new procedures for producing inorganic materials that contain mesopores and/or micropores.

Accordingly, in accordance with the invention, there is provided an inorganic oxide material having a pore structure, wherein at least part of its pores are in the mesopore size range and a part are in the micropore size range, and a method for producing such material as well as materials that contain essentially only mesopores (less than three volume percent and generally less than two volume percent of micropores) in an easy, inexpensive, and reproducible manner.

Furthermore, it is an object of the present invention to provide a silicate material that can easily be modified to have advantageous properties, such as specific catalytic properties for example, by replacing part of the silicon atoms by metal atoms such as aluminium, titanium, vanadium, gallium, iron and the like. Other objects and advantages will become clear from the subsequent description.

In accordance with an aspect of the invention, inorganic oxides that include micropores and mesopores can be prepared in an easy and simple manner by the use of certain compounds, resulting in materials having advantageous properties, such as specific pore structure, high pore volume and the ability to be modified, both on the surface and in the material itself.

In a preferred embodiment, the material of the invention is an amorphous inorganic oxide (preferably a silicate), having a bimodal structure of micropores and mesopores, domains of said micropores being connected to said mesopores, wherein the average mesopore size, determined by $N_2$-porosimetry, is between 2 and 25 nm, and the average micropore size, determined by $N_2$-porosimetry, is between 0.7 and 2.0 nm, preferably between 0.5 and 1.5 nm.

In accordance with one aspect of the present invention, the mesopores of the material have a defined pore size distribution. More particularly, the pore size distribution of the mesopores is such that in a pore size distribution plot wherein the derivative of pore volume is plotted on the y-axis and the pore diameter is plotted on the x-axis, in such a plot, the ratio of the width of the plot at the point of the y-axis which is one-half of the height of the plot, to the pore diameter at the maximum height of the plot is no greater than 0.75 and is preferably no less than 0.01. More preferably such ratio is no greater than 0.5.

The bimodal inorganic material that includes both mesopores and micropores generally includes at least 3 volume percent of micropores (preferably at least 5%) and generally does not include more than 60 volume percent of micropores (preferably no greater than 50%), with such volume percents being based on the combined volume of mesopores and micropores.

In accordance with an aspect of the present invention, there is provided an inorganic oxide that includes both mesopores and micropores, which is prepared by heating a mixture of (1) an inorganic oxide in water, and (2) an organic material that mixes well with the oxide, and preferably forms hydrogen bonds with it. Optionally, the mixture may also include a template of the type that is used for producing micropores in forming molecular sieves (in particular, zeolites) said heating being at temperature levels and for a time sufficient to produce a silicate that contains both mesopores and micropores.

The starting material is generally an amorphous material and may be comprised of one or more inorganic oxides such as silicon oxide or aluminum oxide with or without additional metal oxides. The additional metals may be incorporated into the material prior to initiating the process for producing a structure that contains mesopores and micropores and/or metal may be added to the preparation that is employed for producing an inorganic oxide that contains both micro- and mesopores.

The organic compound(s) that bind(s) to the inorganic oxide by hydrogen bonding is preferably a glycol (a compound that includes two or more hydroxyl groups), or member(s) of the group consisting of triethanolamine, sulfolane, tetraethylene pentamine and diethylglycol dibenzoate.

The template or micropore forming agent that may or may not be combined with the material that hydrogen bonds to the inorganic oxide may be of the type that is generally used for producing molecular sieves or zeolites from silicates. Such templates are generally known in the art.

In general, the templating agent for producing micropores may be an organic compound that contains an element of Group VA of the periodic Table of Elements, particularly nitrogen, phosphorus, arsenic and antimony, preferably N or P and most preferably N. The compounds also contain at least one alkylene, alkyl or aryl group having from 1 to 8 carbon atoms. Particularly preferred nitrogen-containing compounds for use as templating agents are the amines and quaternary ammonium compounds, the latter being represented generally by the formula $R_4 N^+$ wherein R is an alkyl or aryl group containing from 1 to 8 carbon atoms, or mono-, di- and triamines, either alone or in combination with a quaternary ammonium compound or another templating compound. Illustrative organic templating agents are the following: tetramethylamonium ("TMA"), tetraethylammonium ("TEA"), tetra-n-propylammonium ("TPA"), tetraisopropylammonium and tetrabutylammonium salts, di-n-propylamine, di-n-butylamine, tri-n-propylamine, triethylamine, tributylamine, quinuclidine ("Q"), methyl quinuclidine hydroxide, cyclohexylamine, neopentylamine, N,N-dimethylbenzylamine, N-N-dimethylethanolamine, di-n-pertylamine, isopropylamine, t-butylamine, ethylenediamine; hexamethylenediamine, pyrrolidine; 2-imidazolidone, piperidine, 2-methylpyridine, N,N'-dimethylpiperazine, N-methyldiethanolamine, N-methylethanolamine, N-methylpiperidine, 3-methylpiperidine, N-methylcyclohexylamine, 3-methylpyridine, 4-methylpyridine, diethylpiperidinium ("DEPP"), trimethylbenzylammonium ("TMBA"), tetramethylphosphonium ("TMP"), 5-azoniaspiro(4,4)nonane or bispyrrolidinium ("BP"), (2-hydroxyethyl) trimethylammonium ("choline"), 1,4-dimethyl- 1,4-diazoniabicyclo(2,2,2)octane ("DDO"), 1,4-diazoniabicyclo (2,2,2) octane ("DO" or "DABCO"), N,N'-dimethyl-1,4-diazabicyclo(2,2,2) octane ion, etc.

Although a template of the type used for producing a molecular sieve with micropores may be used in the present invention in conjunction with the hydrogen bonding material, and such materials in many cases are known to produce a crystalline structure, when used in the presentinvention, such templates give rise to the formation of micropores while not producing a crystalline structure, although in some cases some crystalline structure is produced. In many cases, the resulting inorganic oxide that includes both micro-pores and meso-pores is a pseudo crystalline material that includes an ordered or regular structure in a three-dimensional pattern without being crystalline.

Without limiting the present invention, it is believed that the material that binds to the inorganic oxide by hydrogen bonding (alone or in combination with the "template") causes the oxide to form a thin-walled structure having meso-pores with micro-pores being formed in such walls. A crystalline-like structure may or may not be present in the thin walls, however, if present, they may not be detected by X-ray diffraction, because of the absence of long range ordering.

The material of the invention is accordingly a mesoporous-microporous amorphous inorganic oxide material (preferably a silicate), which optionally may contain metal ions of groups IVB-IIB and IIIA, such as aluminium or titanium, as part of the mesoporous structure, either added during the preparation and incorporated directly during synthesis, or which may be introduced into the lattice by exchange with the metal ions that are present in the lattice after production. Depending on the nature of the other metal ions the properties of the material differ. For example, by incorporating aluminium in silicates, it is possible to give the material acidic properties, whereas some other metals may result in alkaline properties, thus making it useful as an oxidation catalyst.

The material has a bimodal pore structure including, on the one hand, interconnected mesopores, i.e., pores having a pore diameter between 2 and 25 nm. The mesopores are interconnected, and are believed to be formed by cages having a kind of "sausage structure", the pores having a somewhat spherical shape, generally with two or more connections to other pores at two opposite ends thereof. On the other hand, the material also contains domains or phases of micropores, which are connected to mesopores. Thus, in accordance with an aspect of the present invention, there is provided a one-step method to produce a bimodal pore system. In a preferred embodiment, the inorganic material of the present invention includes both mesopores and micropores, and such mesopores and micropores are present in a manner such that the micropores exist in only small domains, i.e., the width of a domain of micropores is generally no greater than 5 nm.

In the inorganic material of the present invention that is bimodal, there is a distinct peak of micropores and a distinct peak of mesopores in a plot of the derivative of pore volume against pore size. In general, the width of the micropore peak at half-height is no greater than 2 angstroms and generally no greater than 1 angstrom.

The mesoporous and mesoporous-microporous materials according to the invention are a pseudo-crystalline material (no crystallinity is observed by presently available x-ray diffraction techniques). According to one embodiment the materials have one peak in the XRD diffraction pattern, where 2θ is between 0.5 and 2.5°. The presence of one peak means that the material has an extremely regular structure, without being crystalline. Said regular structure is determined by a distribution of wall thicknesses, in combination with a narrow size distribution of the sizes of the mesopores. The wall-to-wall distance of the mesopores will preferably be between 3 and 25 nm. A material produced in accordance with the invention that contains essentially only micropores does not have a peak in the x-ray diffraction pattern.

The material having a bimodal pore structure is suitable for carrying out all kinds of chemical reactions which require, on the one hand, large pores and, on the other hand, small pores. Examples thereof are reactions where large molecules can easily enter the system via the mesopores and are then reacted or converted in the micropores. This may result in selective reactions. The material intrinsically has a high surface area in combination with large pores that result in high accessibility and consequently high intrinsic volumetric activity. Another advantage of creating ordered microdomains in the walls of the mesoporous structure is the possibility of introducing catalytic sites with higher acid strength than hitherto possible in purely mesoporous materials.

Another example of the suitability of the materials is in petroleum chemistry, wherein large molecules are first converted in the mesopores into smaller molecules which subsequently reacted in the micropores. In this way, one may get very controlled and selective conversion of, for example, oil fractions.

The inorganic oxide may consist of silicon and oxygen only. Part of the silicon may be replaced by another metal, preferably by adding a source of said metal during the preparation of the material. Examples of suitable metals are titanium, vanadium, zirconium, gallium, manganese, zinc, iron and aluminium.

Furthermore, it is possible to exchange, after preparation of the material, cations in the system with other ions, such as those of an alkali metal. In this manner, carefully controlled properties can be generated. For example, the presence of titanium as an additional component in silicate creates additional catalytic properties (for example, oxidation properties) on the internal surface of the material, which may be a very interesting feature, especially in fine chemistry.

In case highly ordered microdomains are also formed in the walls of the mesoporous structure, they generally will be invisible to the x-ray detection since the repeating units of the micro-domain structure will be too small to detect. However, the micro-domains will measurably affect the acidity of the material.

The material, according to the invention, generally has an average surface area as determined by BET ($N_2$) of between 400 and 1200 $m^2/g$. The combined micro- and mesopore volume determined by nitrogen absorption will generally be between 0.3 and 2.2 ml/g.

An important advantage of the materials of the present invention is the stability thereof. It has been found that the material is more stable than the standard mesoporous materials, such as MCM-41 of Mobil. This stability is determined in terms of decrease of intensity of the most important peak in XRD, pore volume and pore size after treatment of the material in boiling water, for example, for about 2 hours.

More in particular, the material is prepared by a process which comprises providing an aqueous phase having dispersed therein an inorganic oxide precursor, such as a silica source. Preferably, this is a solution of a suitable silicate. Generally, the pH of the aqueous phase will preferentially be above 7. Optionally, the aqueous phase may contain other metal ions such as derivable from an aluminium salt. The aqueous phase also includes an organic material that binds to the silicate, in particular, by hydrogen bonding and in some cases may further include a micropore forming agent of the type used for producing micropores in zeolite production. The material that binds to the silica should not be too hydrophobic so as to form a separate phase. Finally, it is advantageous if such material has a relatively high boiling point, such as at least 150° C. Examples of suitable materials are triethanolamine, sulfolane, tetraethylenepentamine, diethylglycoldibenzonate or glycols (compounds that have two or more hydroxyl groups), such as glycerol, diethylene glycol, triethylene glycol and tetraethylene glycol. To achieve good mixing between the inorganic oxide precursor solution and the aqueous hydrogen bonding compound/template mixture, drop-wise addition of the template/hydrogen bonding compound solution to the inorganic oxide phase is preferred. The addition rate is generally between 2 and 20 g/min. and preferably between 3 and 8 g/min.

In a preferred embodiment, the mixture also includes an alcohol, preferably an alkanol. The alcohol may be added to the mixture or may be produced by decomposition of the material that is used as the source of the metal oxide. For example, when using tetraethyl orthosilicate as a source of silica, upon heating, ethanol is produced, or when using aluminum isopropoxide as a source of alumina, propanol is produced. Thus, in a preferred embodiment, an alcohol may be included in the mixture or generated from one of the materials used during the process.

Depending on the type of inorganic oxide source, the material may be first aged at a temperature, for example, from 5° C. to 45° C.; e.g., at room temperature, for a period, to expel any organic compounds from the inorganic oxide source (such as from tetraethyl orthosilicate), for example, up to 48 hrs. After the aging stage, the material is subsequently gradually heated to about the boiling point of water. Thereby the water and the organic components generated from the inorganic oxide source (such as methanol or ethanol) evaporate. In order to obtain a product with the desired high integrity, it is preferred to achieve a homogeneous heating rate and the absence of a temperature profile in the precursor phase during this drying step. This is achieved by maximizing the heat transfer surface area of the gel during the evaporation, e.g., by using shallow beds, breaking up the solid phase after drying, or by using rotary evaporators. During this drying stage, the organic molecules that aid in forming the micro and mesopores should not be removed from the system to a substantial degree. Accordingly, the organic material that binds to the inorganic oxide should preferably have a boiling point above, at least, 150° C. The drying may take, for example, 6 to 48 hrs.

After the drying stage to remove water, which is maintained, for example, for about 6 to 48 hours the inorganic oxide, which still contains the mesopore forming agent, is heated to a temperature at which there is substantial production of mesopores; i.e., a temperature above the boiling point of water and up to the boiling point of the mesopore forming agent. The temperature of the system may be increased to a calcination temperature, for example, temperatures of from 300° C. to 1000° C., preferably at least 400° C., and maintained at such temperature for a time sufficient to effect such calcination of the material. To prevent hot spots, the heating rate should be sufficiently low and the height of the sample bed should be limited. The heating rate during calcination is preferably between 0.1 and 25° C./min., more preferably between 0.5 and 15° C./min., and most preferably between 1 and 5° C./min. The material may be subjected to hydrothermal treatment prior to drying or after drying and prior to calcination, e.g., in a sealed vessel at autogenous pressure and at temperatures above 100° C. and which generally do not exceed 350° C. The size of the mesopores and the volume of micropores in the final product are influenced by the length and temperature of the hydrothermal step. In general, it is observed that in the final product the percentage of mesopores increase and the percentage of micropores decrease with increasing temperature and increasing duration of the hydrothermal treatment. Preferably, to maintain micropore volume the hydrothermal step is not used. It is also possible to extend the hydrothermal treatment such that the micropore volume becomes negligible and the material contains essentially only mesopores.

It is within the scope of the invention to remove the template molecules from the inorganic oxide, prior to reaching a temperature at which mesopores are substantially formed, for example, by extraction which leads to the formation of a material with pores smaller than 20 Å, which also contains mesopores; however, there is no distinct peak of mesopores when a plot is prepared of the derivative of pore volume against pore size. For example, mesopores are not substantially formed at temperatures below 100° C.; however, it may be possible to heat to temperatures somewhat in excess of 100° C. without mesopore formation.

During the calcination, the structure of the material is finally formed, while furthermore the organic molecules are expelled from the system and can be recovered for re-use. If necessary, the material may be washed, although generally the type of components are such that no washing is necessary, as no additional components will be present in the system. Due to this method of preparation, no waste water is produced. A further advantage of the invention resides therein, that the preparation method is highly efficient, due to the 100% utilization of the silica and the possibility of recovery of the organic compounds.

If necessary, further steps may be taken to add metal ions such as titanium, vanadium, zirconium, gallium, manganese, zinc, nickel, cobalt, chromium, molybdenum, or iron by impregnation, ion exchange, or by replacing part of the lattice atoms, as described in G. W. Skeels and E. M. Flanigen in M. O. ccelli, et al., eds., A.C.S. Symposium Series, Vol. 398, Butterworth, pgs. 420435 (1989). For silicate structures, it also is possible to treat the surface layer of the inside of the pores in such a manner that the silicate material is converted to a zeolitic structure, e.g., by impregnation with an aqueous solution of a template. In this manner, one has obtained, with a bimodal pore size, a material having pores with a zeolitic inside structure. This may be done by "skin modification," which means that a suitable metal or template ion is positioned in the wall, followed by a heat treatment. This method of skin modification has been disclosed in the plenary lecture "Zeolite Coatings" by J. C. Jansen, at the 12$^{th}$ IZC, Baltimore, July 1998 (Proc. 12$^{th}$ IZC Baltimore, M. M. J. Treacy et al eds., MRS Warrendale (Pa.), (1999), I, 603–611) and in the references cited in this lecture.

Also, it is possible to adapt the properties of the material with a catalytically active material such as a precious metal, by impregnation or by a combination of ion exchange and reduction. Moreover, it also is possible to attach (graft) functional components on the wall by reaction of surface hydroxyl groups with the compound in the gas or liquid phase.

In the present description, mention has been made of micropore sizes and mesopore sizes. Micropores are defined as pores having a diameter of less than 2.0 nm. Mesopores are defined as pores in the range of 2 to 50 nm. The pore size distribution of materials prepared by the present invention may be determined by nitrogen adsorption and desportion and producing from the acquired data a plot of the derivative of pore volume as a function of pore diameter.

The nitrogen adsorption and desorption data may be obtained by using instruments available in the art (for example Micrometrics ASAP 2010) which instruments are also capable of producing a plot of the derivative of pore volume as a function of the pore diameter. In the micro pore range, such a plot may be generated by using the slit pore geometry of the Horvath-Kawazoe model, as described in G. Horvath, K. Kawazoe, J. Chem. Eng. Japan, 16(6), (1983), 470. In the mesopore range, such plot may be generated by the methodology described in E. P. Barrett, L. S. Joyner and P. P. Halenda, J. Am. Chem. Soc., 73 (1951), 373–380.

In an embodiment of the invention, the pore size distribution of materials produced in the present invention, in the mesopore range, is such that a pore size distribution curve of the derivative of pore volume (dV) as a function of pore diameter is such that at a point in the curve that is half the height thereof (one-half of the maximum pore volume), the ratio of the width of the curve (the difference between the maximum pore diameter and the minimum pore diameter at the half height) to the pore diameter at the maximum height of the plot (as hereinabove described) is no greater than 0.75.

The invention will be further described with respect to the following examples; however, the scope of the invention is not limited thereby.

EXAMPLES

Example 1

Figure 1:
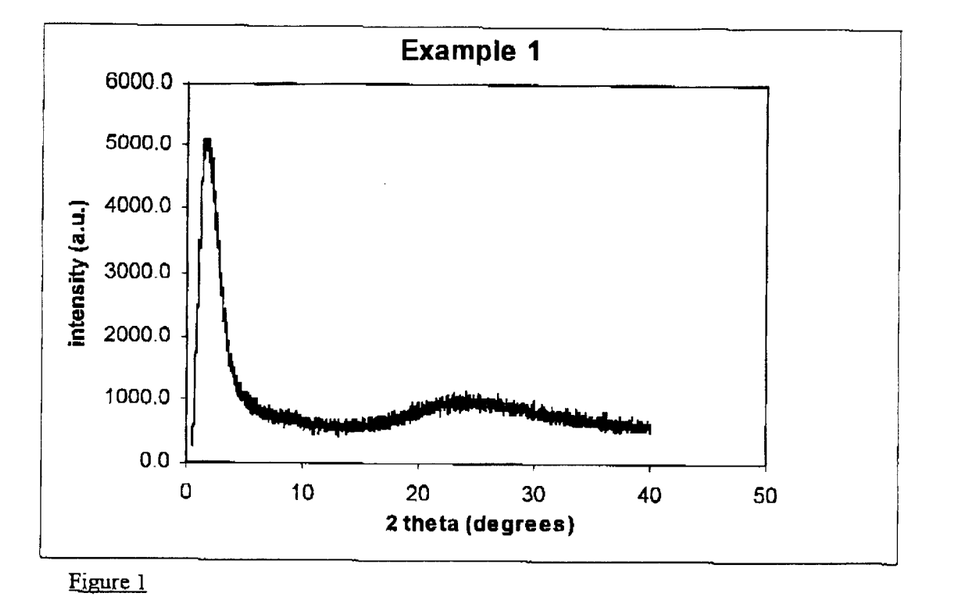
FIG. 1 is an x-ray pattern of material produced in Example 1.
Figure 1B:
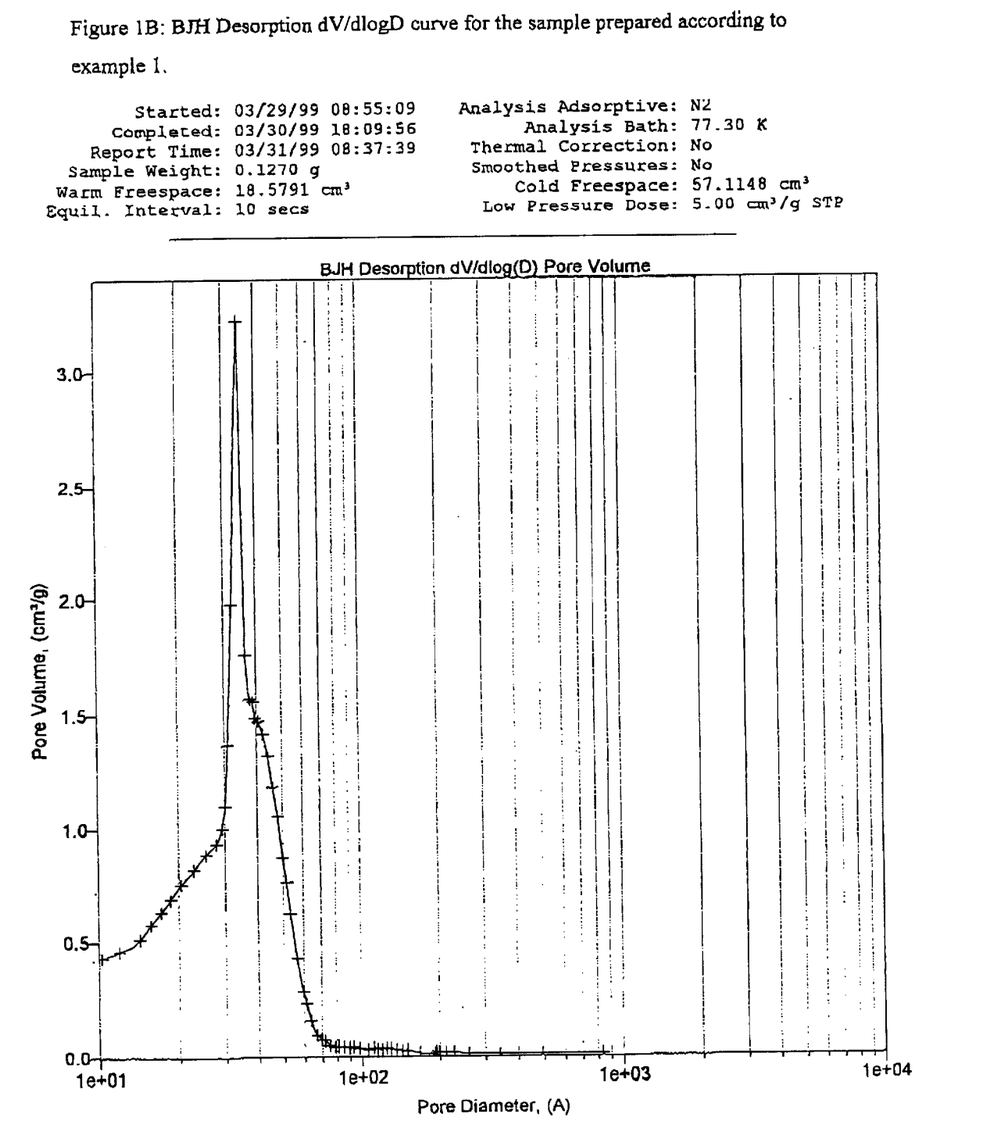
FIG. 1B is a plot of the derivative of pore volume as a function of pore diameter for the micropores of the material of Example 1.
Figure 1C:
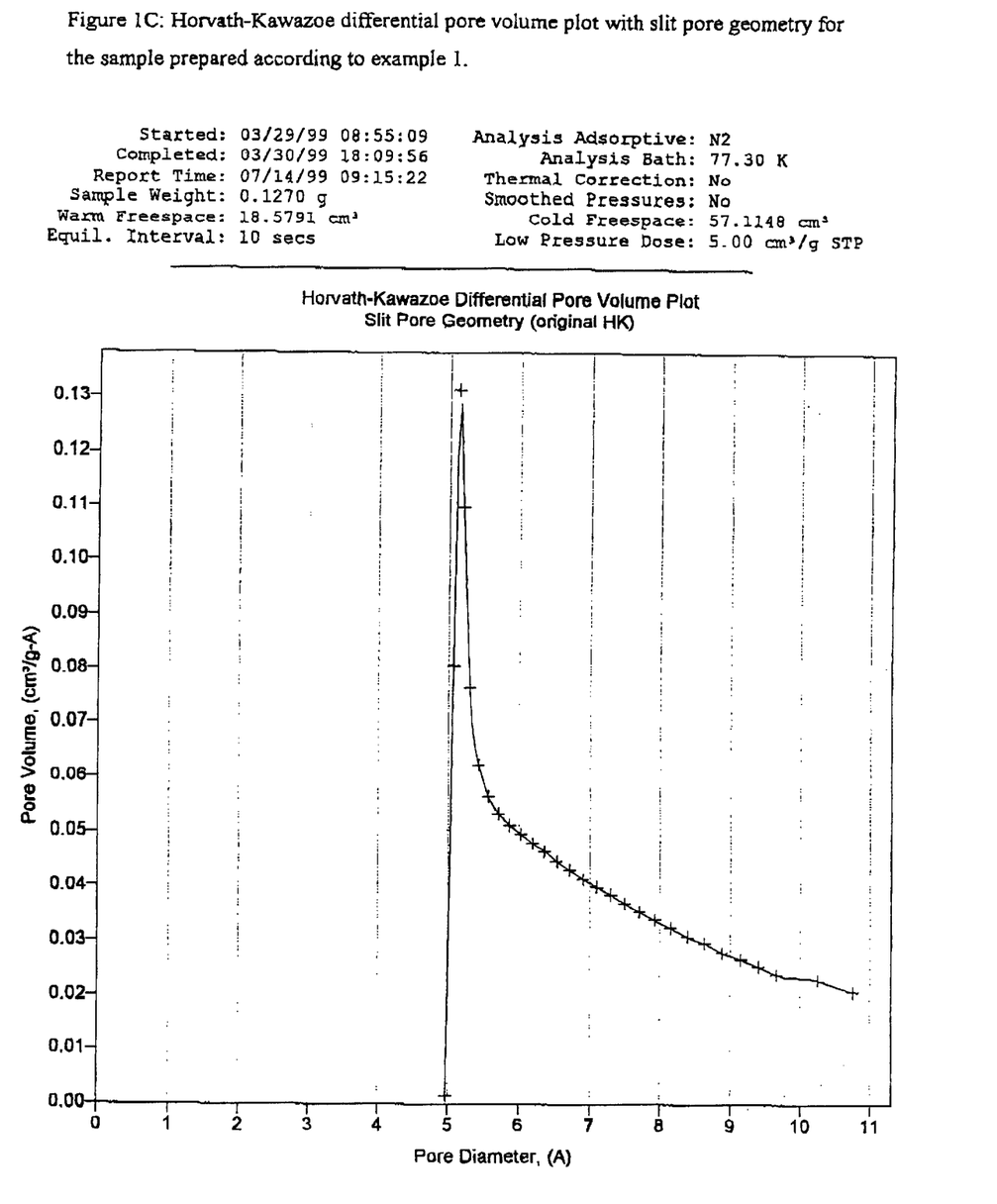
FIG. 1C is a plot of the derivative of pore volume as a function of pore diameter for the mesopores of the material of Example 1.

First, 1.3 g aluminium isopropoxide was dissolved in 39.1 g TPAOH tetrapropylammonium hydroxide (40%) aqueous solution. Next, 47.88 g triethanolamine (97%, ACROS) and 14.0 g water were mixed. The triethanolamine mixture was added drop-wise (8–10 g/min) to the aluminium containing mixture under stirring. Finally 33.1 g tetraethyl orthosilicate (98%, ACROS) was added drop-wise (4–6 g/min) to the resulting mixture while stirring. The final mixture was aged at room temperature for 48 h, spread out in a dish to form a layer that had a height of 1.0–1.2 cm and dried at 100° C. for 18 h in a static air furnace. The resulting material was calcined in air using the following procedure: with a heating rate of 1° C./min to 500° C., hold for 4 hours, with 1° C./min to 550° C., hold for 10 hrs. The X-ray pattern of the resulting product is shown in FIG. 1. The $N_2$ porosimetry results are given in Table 1.

Example 2

Drop-wise addition of 17.37 g triethanolamine (75%, ACROS) took place at 4–6 g/min to a mixture of 94.72 g tetraethyl orthosilicate (98%, ACROS) and 136.87 g water under stirring. The homogeneous mixture was aged at room temperature for 16 h. The aged mixture was transferred to a dish to form a layer with a height of 1.8–2.0 cm and dried in a static air furnace of 100° C. for 24 hrs. Next the dried product was hydrothermally treated at 190° C. for 48 hrs. Calcination took place in air by heating at 1° C./min to 550° C. and holding for 10 hrs.

Figure 2:
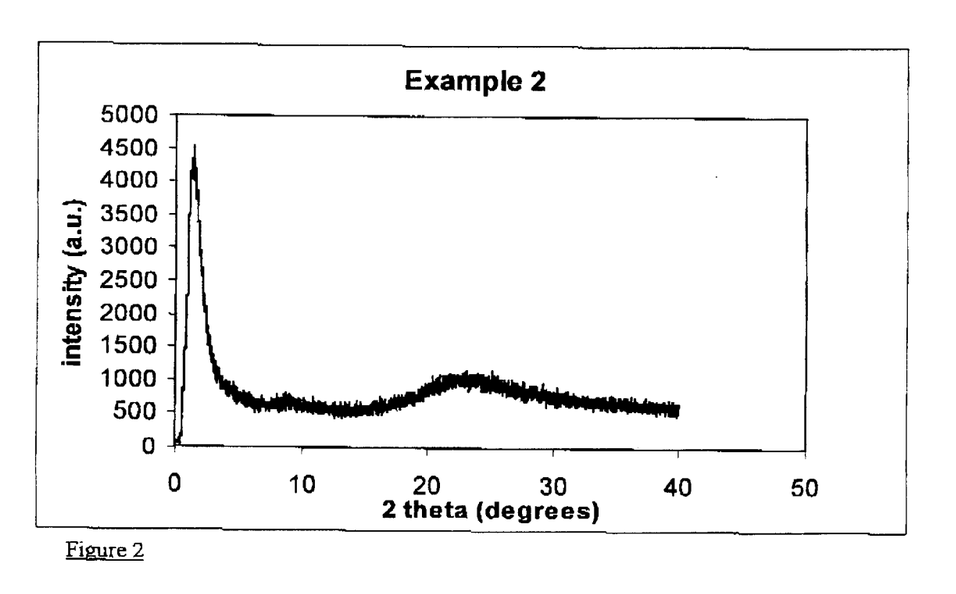
FIG. 2 is an x-ray pattern of material produced in Example 2.
Figure 2B:
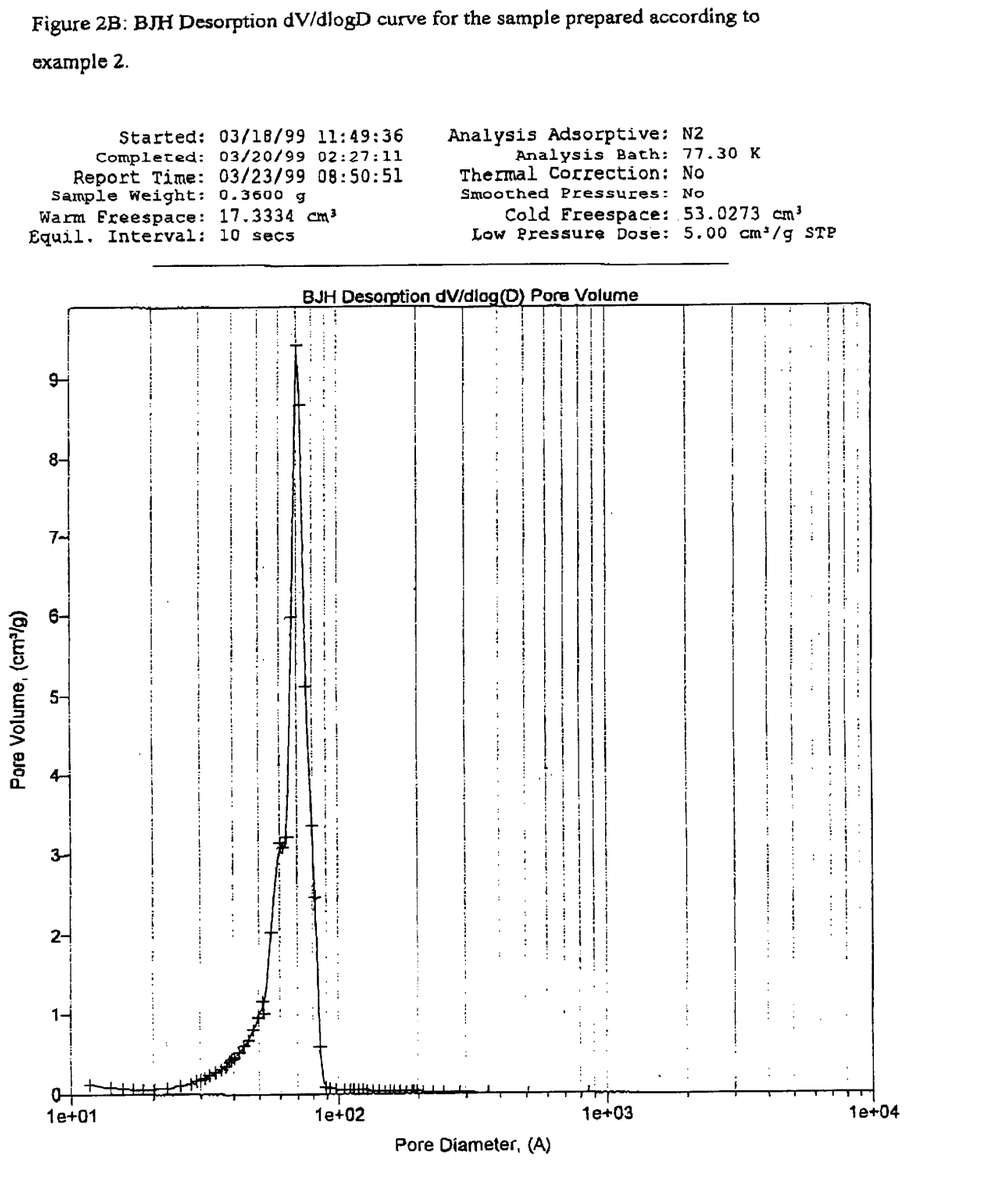
FIG. 2B is a plot of the derivative of pore volume as a function of pore diameter for the micropores of the material of Example 2.
Figure 2C:
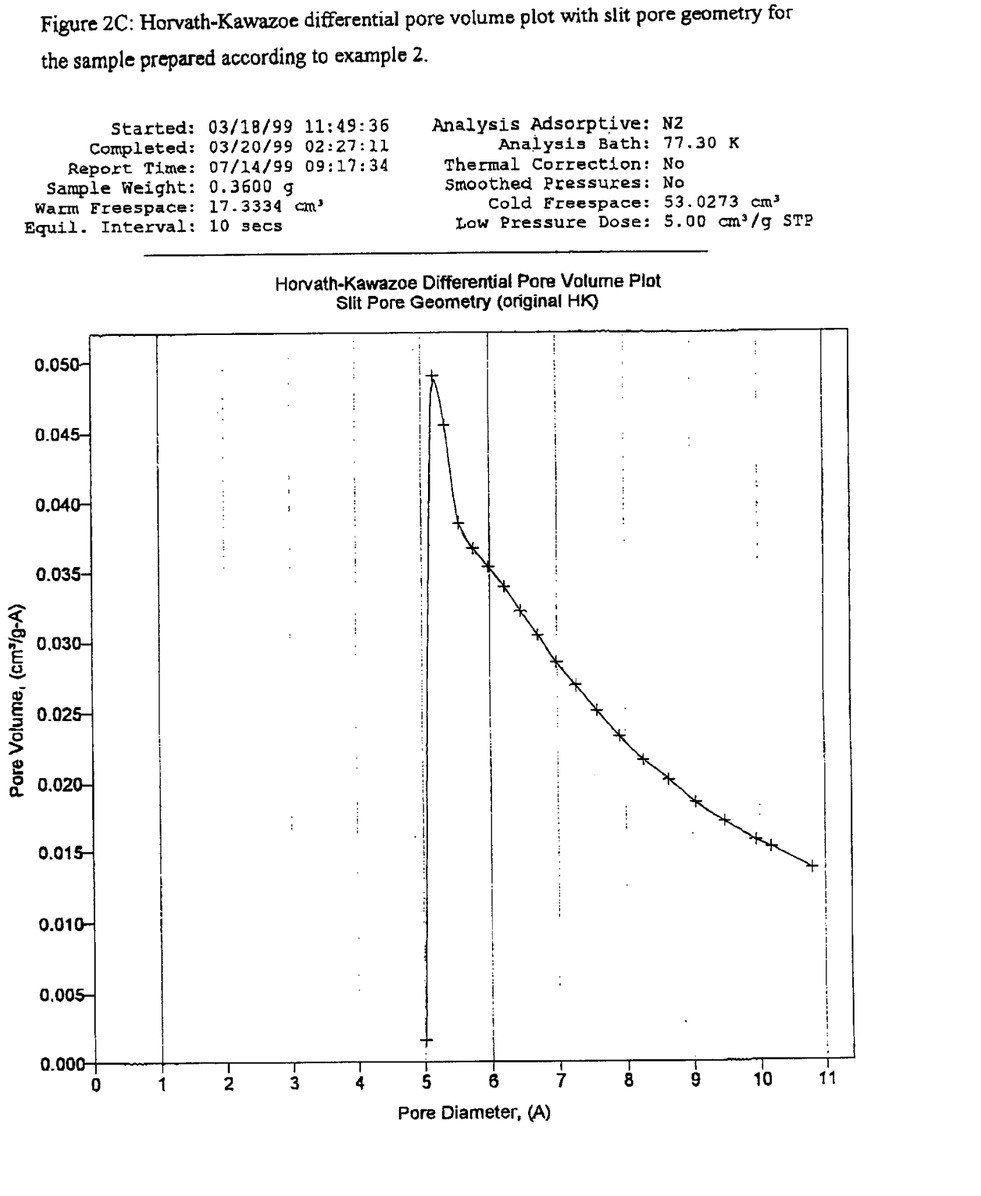
FIG. 2C is a plot of the derivative of pore volume as a function of pore diameter for the mesopores of the material of Example 2.

The X-ray diffraction pattern is given in FIG. 2. The nitrogen porosimetry results are given in FIG. 2B, 2C and Table 1.

Example 3

Figure 3:
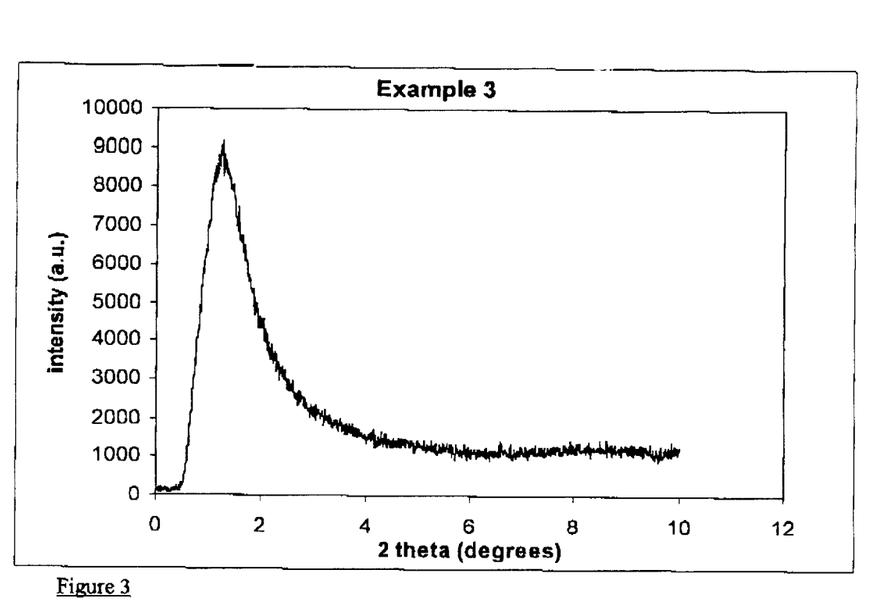
FIG. 3 is an x-ray pattern of material produced in Example 3.
Figure 3B:
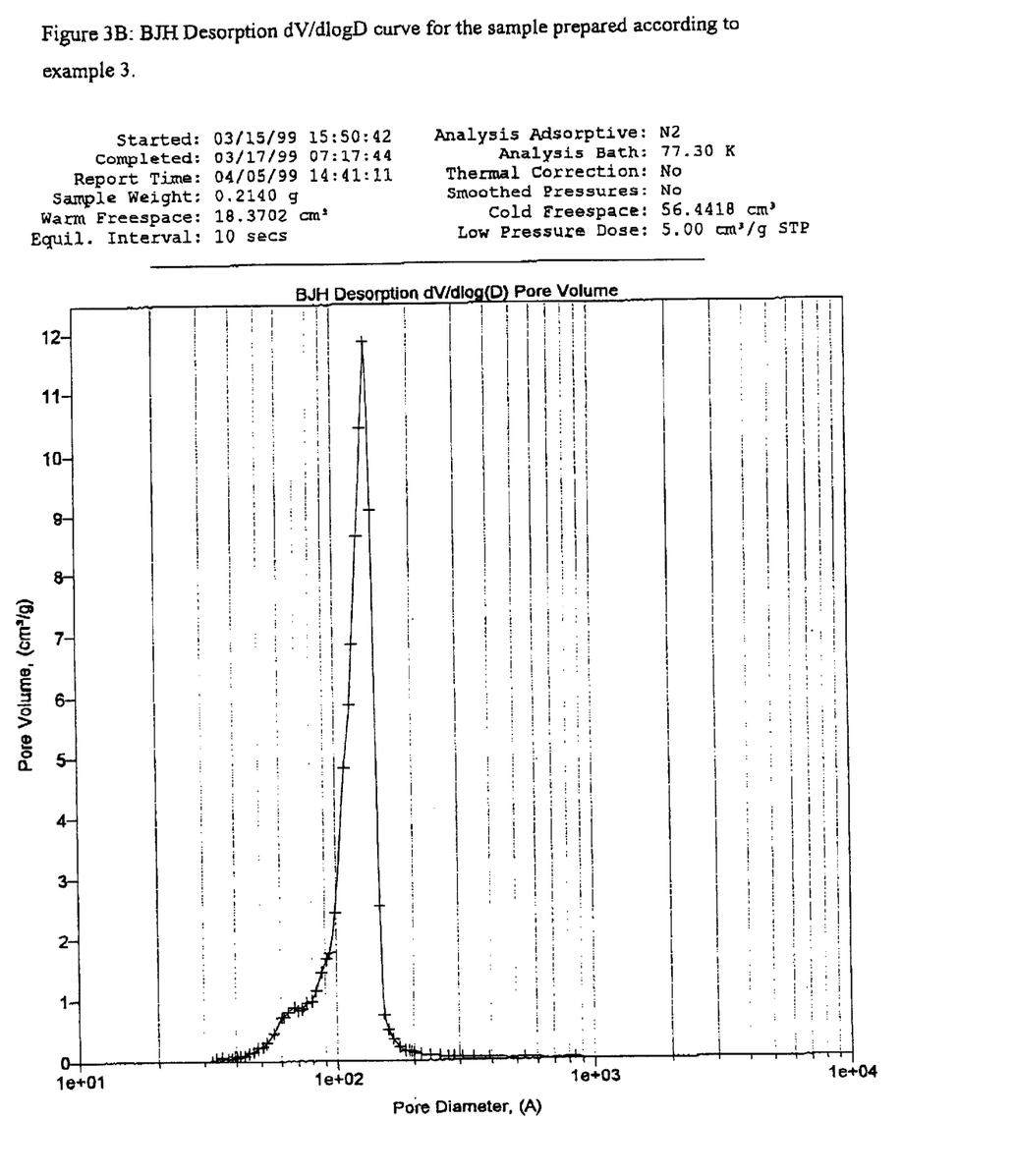
FIG. 3B is a plot of the derivative of pore volume as a function of pore diameter for the micropores of the material of Example 3.
Figure 3C:
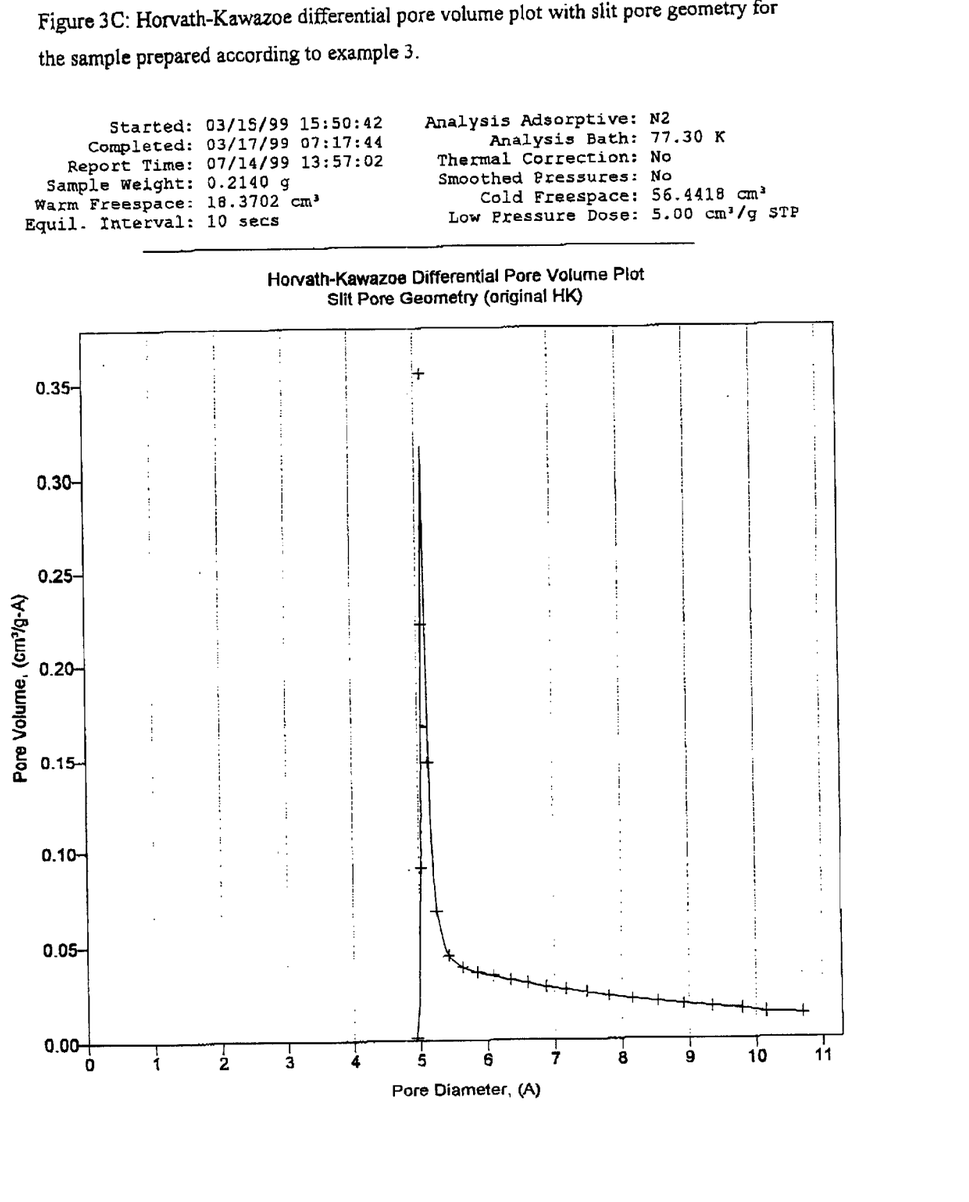
FIG. 3C is a plot of the derivative of pore volume as a function of pore diameter for the mesopores of the material of Example 3.

A mixture of 2.1 g of aluminium isopropoxide and 60.6 g isopropanol was made. To this mixture 53.06 g tetraethyl orthosilicate (98%, ACROS) was added drop-wise (8–10 g/min). Next, a mixture of 38.39 g triethanolamine (97%, ACROS) and 114.37 g water was added drop-wise (8–10 g/min) to the mixture above. Finally, 31.5 g tetraethyl ammonium hydroxide was added slowly (4–6 g/min) while stirring. The final mixture was aged at room temperature for 24 hrs. The mixture was transferred into a dish to form a layer with a height of 1.8–2.0 cm and dried in a static air furnace at 100° C. for 24 hrs. The dried product was hydrothermally treated at 190° C. for 24 hrs. Calcination took place in air at a heating rate of 1° C./min to 500° C., holding for 4 hrs. followed by heating at 1° C./min to 600° C. and holding for 10 hrs. FIG. 3 shows the X-ray diffraction pattern of the product. The $N_2$ porosimetry results are given in FIGS. 3B, 3C and Table 1.

Example 4

Figure 4:
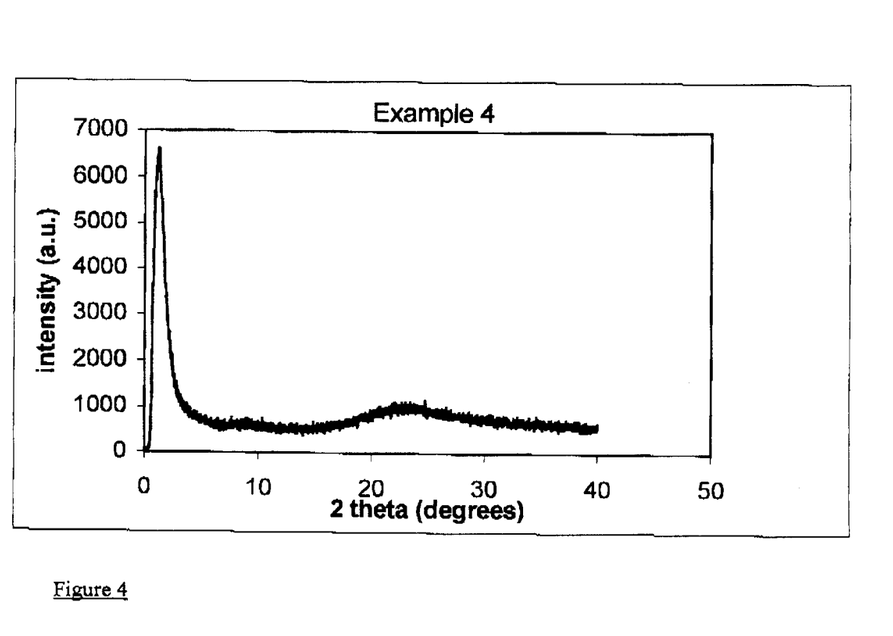
FIG. 4 is an x-ray pattern of material produced in Example 4.

A mixture of 29.12 g tetraethylene glycol (99%, ACROS) and 107.46 g water was added slowly (4–6 g/min) to 63.42 g tetraethyl orthosilicate (98%, ACROS) under stirring. The synthesis mixture was aged at room temperature for 22 hrs. The synthesis mixture was transferred to a dish to form a layer of approximately 1.8–2.0 cm and dried in a static air furnace at 100° C. for 24 hrs. Hydrothermal treatment took place in an autoclave at 190° C. for 24 hrs. The sample was calcined in air at 550° C. for 10 hrs. calcined with a heating rate of 1° C./min. FIG. 4 depicts the X-ray diffraction pattern of the product. The nitrogen porosimetry results are given in Table 1.

Example 5

A mixture of 25.29 g triethanolamine, 17.29 g tetraethyl ammonium hydroxide (25%) and 18.01 g water was added drop-wise (4–6 g/min) into another mixture of 1.1 g titanium (IV) N-butoxide and 34.95 g TEOS under stirring. The final homogeneous mixture was aged at room temperature for 24 hrs. The mixture was transferred to a dish to form a layer of approx. 1.8–2.0 cm, and dried in a static air furnace at 100° C. for 24 hrs. The dried product was calcined at 600° C. for 10 hrs. with a ramp rate of 1° C./min in air.

Figure 5:
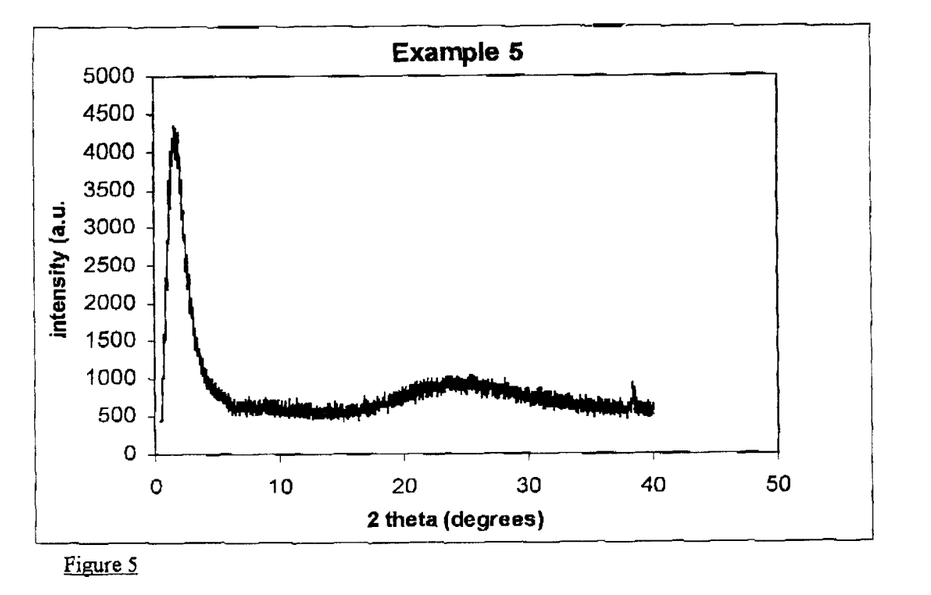
FIG. 5 is an x-ray pattern of material produced in Example 5.
Figure 5B:
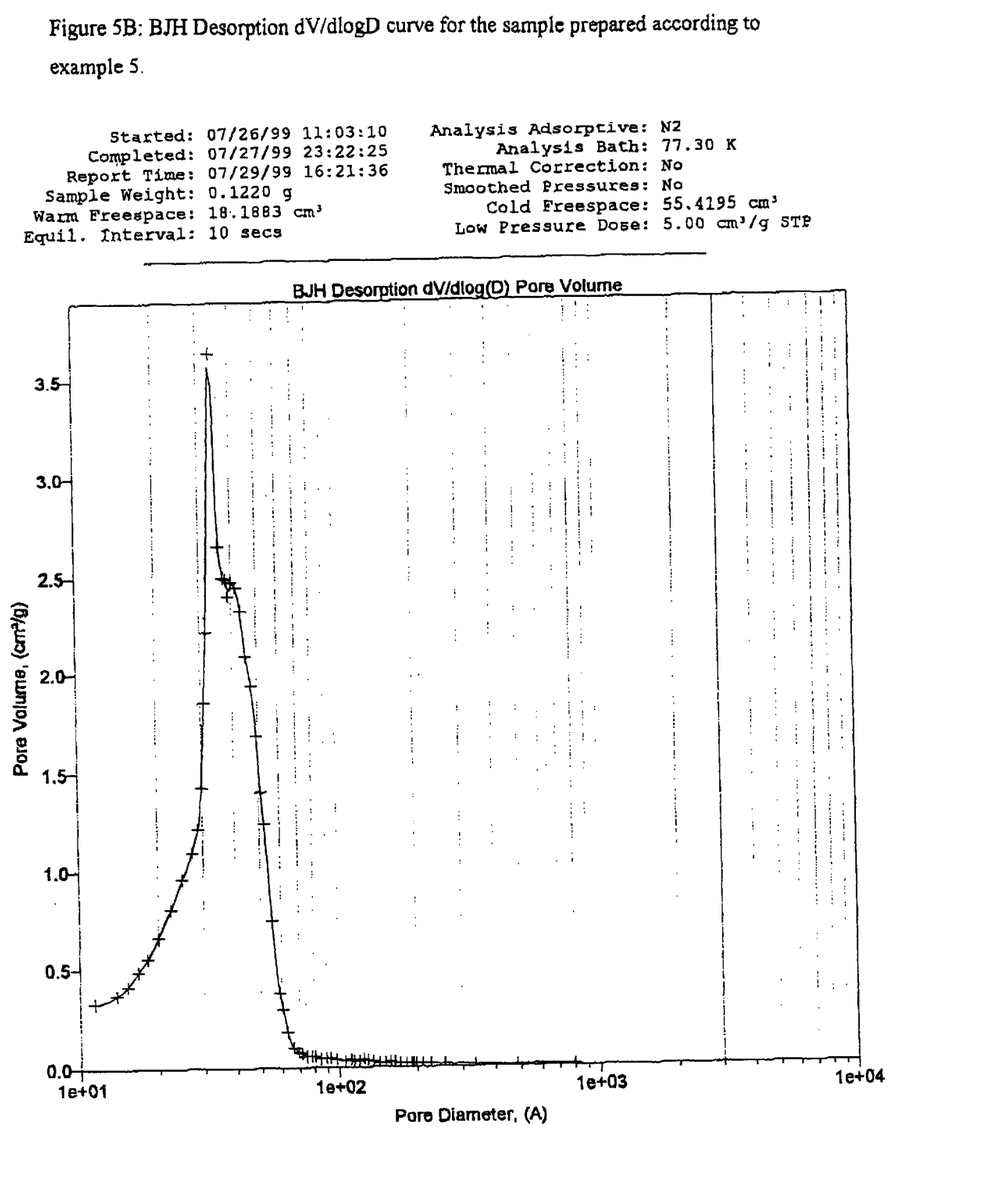
FIG. 5B is a plot of the derivative of pore volume as a function of pore diameter for the micropores of the material of Example 5.
Figure 5C:
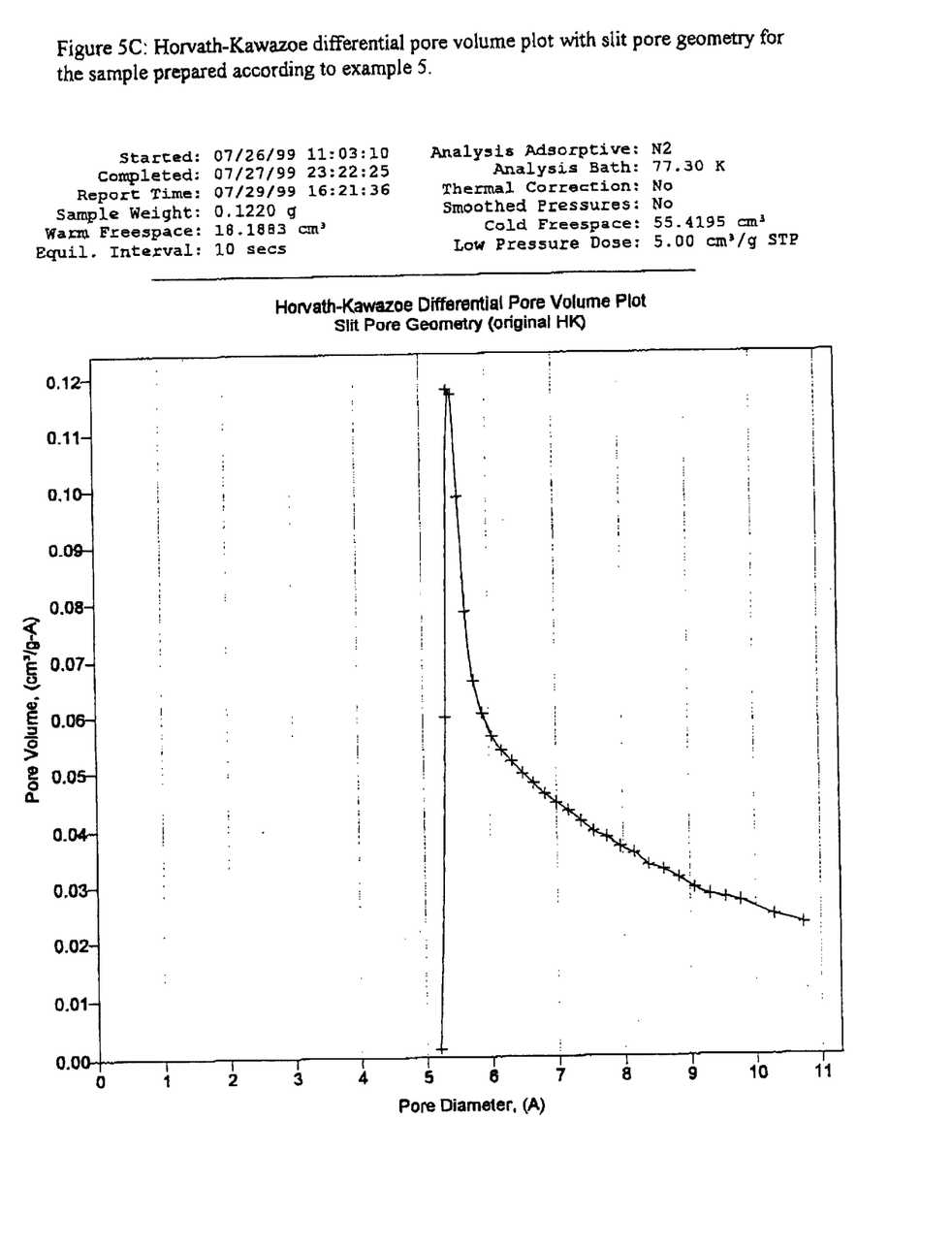
FIG. 5C is a plot of the derivative of pore volume as a function of pore diameter for the mesopores of the material of Example 5.

Its porosity was determined using nitrogen adsorption isotherm, which was measured at 77 K using the Micromeritics ASAP 2000. FIG. 5A shows the X-ray diffraction pattern of the product. The nitrogen porosimetry results are given in FIGS. 5B, 5C and Table 1. Chemical composition was analyzed using Inductive Coupled Plasma-Atomic Emission Spectroscopy and it showed 1.65 wt % Ti.

Catalytic activity was evaluated using cyclohexene epoxidation as a model reaction, which was carried out at 40° C. under $N_2$ flow in a flask with a reflux condenser. Tert-butyl hydroperoxide (TBHP) (70% aqueous solution) as an oxidant was dried using anhydrous magnesium sulphate before use. 10 mmol cyclohexene (99%), 11 mmol TBHP was added into 10 ml of dichloromethane containing 5 mmol mesitylene as an internal standard. When the temperature reached 40° C., 0.11 g of the catalyst was introduced into the reactant mixture. Samples were analyzed by GC (WAX 52 CB). The turnover frequency, defined as moles of cyclohexene converted per mole of titanium per hour, reached 20.2 $h^{-1}$ after 6 hrs. This is about 5 times higher than over titanium containing MCM-41 under the same reaction conditions as described in C. H. Rhee, J. S. Lee, Catal. Lett., 1996, Vol. 40, 261–264.

Example 6

25.55 g tetraethyl orthosilicate (98%, ACROS) was added slowly (4–6 g/min) into a mixture of 17.37 g triethanolamine (97%, ACROS) and 56.98 g water under stirring. The obtained homogeneous synthesis mixture was aged at room temperature for 24 hrs. Next the mixture was transferred to a dish to form a layer of 1.8–2.0 cm height, and dried in a static air furnace at 100° C. for 18 hrs. The dried sample was calcined at 550° C. in air with a ramp rate of 1° C./min.

Figure 6:
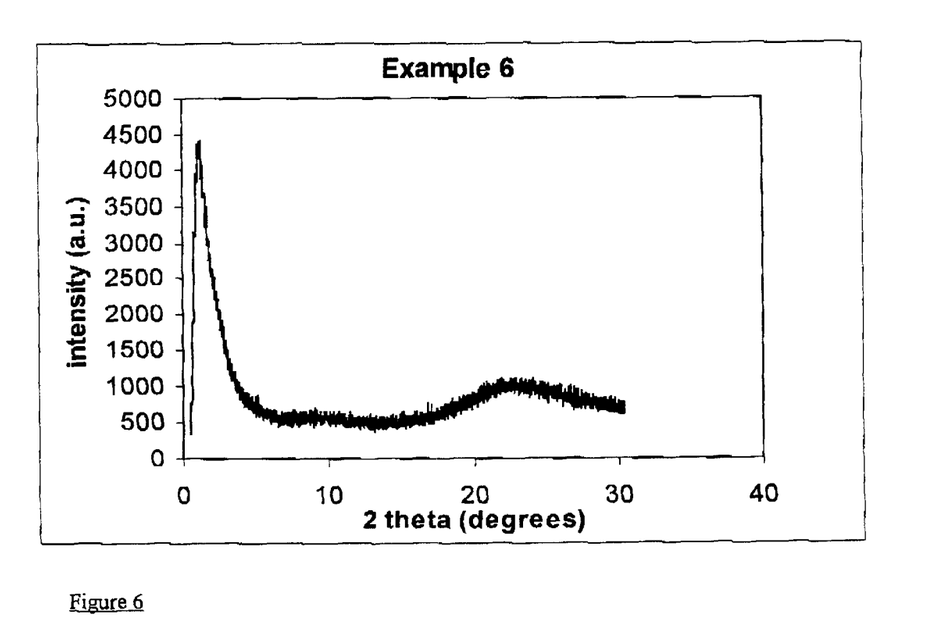
FIG. 6 is an x-ray pattern of material produced in Example 6.

FIG. 6 shows the X-ray diffraction pattern of the product. The nitrogen porosimetry data are given in Table 1.

Example 7

A mixture of 29.12 g tetraethylene glycol (99%, ACROS) and 107.46 g water was added slowly (4–6 g/min) to 63.42 g tetraethyl orthosilicate (98%, ACROS) under stirring. The synthesis mixture was aged at room temperature for 22 h. The synthesis mixture was transferred to a dish to form a layer of approximately 1.8–2.0 cm and dried in a static air furnace at 100° C. for 24 h. The dried sample was Soxleth extracted using chloroform for 2 days and dried in air at 100° C. The product did not have a peak in the X-ray diffraction pattern between 2θ=0.5 and 50°. The $N_2$ porosimetry results are given in Table 1.

TABLE 1

Nitrogen Porosimetry Data For Products of Example 1–7

| Example no. | BET ($m^2/g$) | Vmicro <10 Å ($cm^3/g$) | Vmicro 10–20 Å ($cm^3/g$) | Vmeso ($cm^3/g$) | Mesopore peak max. (nm) | Peak width at half height of mesopore peak (nm) | Percent micropores | Mesopore Ratio of half-height width to pore size at maximum height |
|---|---|---|---|---|---|---|---|---|
| 1 | 905 | 0.015 | 0.157 | 0.61 | 3.3 | .6 | 28 | 0.18 |
| 2 | 571 | 0.011 | 0.023 | 1.01 | 7.0 | .6 | 3.4 | 0.09 |
| 3 | 589 | 0.057 | 0.027 | 1.62 | 13.0 | 3.0 | 5.2 | 0.23 |
| 4 | 505 | 0.001 | 0.013 | 1.24 | | | 1.1 | 0.22 |
| 5 | 972 | 0.05 | 0.138 | 0.798 | 3.1 | 2.0 | 23 | 0.65 |
| 6 | 491 | 0.002 | 0.019 | 1.47 | 18.0 | 4.5 | 1.4 | 0.25 |
| 7 | 791 | 0.053 | 0.364 | 0.122 | n.o.* | n.o.* | 75 | |

*n.o.: no distinct mesopore peak observed

It is understood that, although in a preferred embodiment the inorganic material is produced from silica alone or in combination with other metal oxides, it is within the spirit and scope of the invention to produce the inorganic oxide from other metals alone (for example, alumina, titania, zirconia, etc.) or combinations of metals that do not include silica.

Numerous modifications and variations of the present invention are possible in light of the above teachings and, therefore, within the scope of the appended claims, the invention may be practiced otherwise than as specifically described.

What is claimed is:

1. A process for producing an inorganic oxide that contains micro- and mesopores, comprising:
   heating a mixture comprising water, an inorganic oxide and at least one compound that binds to the inorganic oxide by hydrogen bonding, said heating being to a temperature and for a time to produce an inorganic oxide that contains both micropores and mesopores.

2. The process of claim 1 wherein said compound is a triethanolamine, sulfolane, tetraethylenepentamine, diethylglycoldibenzonate or a glycol.

3. The process of claim 2 wherein said compound is a glycol.

4. The process of claim 1, wherein the mixture further includes a micropore forming agent.

5. The process of claim 4 wherein said micropore forming agent is a quaternary ammonium salt.

6. The process of claim 4 wherein the inorganic oxide is an amorphous silicate.

7. The process of claim 6 wherein the heating includes maintaining the mixture at about the boiling point of water to evaporate water and volatile organics from the inorganic oxide, followed by calcining at a temperature of above 300° C.

8. The process of claim 3 wherein the glycol has a boiling point of at least 150° C.

9. The process of claim 8 wherein the glycol is selected from the group consisting of glycerol, diethylene glycol, triethylene glycol and tetraethylene glycol.

10. The process of claim 9 wherein the mixture additionally contains a source of ions selected from the group consisting of IVA, VB, VIB, VIIB, VIII, IB, IIB and IIIA elements.

11. The process of claim 9 wherein the mixture additionally contains a source of aluminium ions.

12. The process of claim 1 wherein the inorganic oxide is a silicate material selected from the group consisting of tetraethyl orthosilicate, fumed silica, sodium silicate and silica sol.

13. The process of claim 1 wherein the inorganic oxide comprises alumina.

14. The process of claim 1 wherein said heating comprises:

heating said mixture to about the boiling point of water, whereby water is evaporated from said mixture, and said compound that binds to the inorganic oxide by hydrogen bonding is retained in said mixture; and heating said mixture to a temperature above the boiling point of water and up to the boiling point of said compound which binds to said inorganic oxide by hydrogen bonding, whereby said mesopores and said micropores are formed in said inorganic oxide.

15. The process of claim 14 wherein said compound which binds to said inorganic oxide by hydrogen bonding has a boiling point of at least 150° C.

16. The process of claim 1 wherein said inorganic oxide containing both micropores and mesopores includes at least 3 volume percent and not more than 60 volume percent of micropores.

17. A process for producing an inorganic oxide that contains only mesopores and less than 3 volume percent micropores, comprising:

heating a mixture containing water, an inorganic oxide and at least one compound that binds to the inorganic oxide by hydrogen bonding, said heating being to a temperature and for a time to produce an inorganic oxide that contains both micropores and mesopores, and hydrothermally heating said inorganic oxide containing both micropores and mesopores to reduce the micropores to less than 3 percent by pore volume of mesopores and micropores.

18. A process for producing an inorganic oxide that contains mesopores and a substantial amount of micropores, comprising:

heating a mixture comprising water, an inorganic oxide and at least one compound that binds to the inorganic oxide by hydrogen bonding, said heating being to a temperature below the temperature at which there is substantial formation of mesopores, and removing said at least one compound at a temperature below the temperature at which there is substantial formation of mesopores to produce an inorganic oxide that contains mesopores and a substantial amount of micropores.

19. The process of claim 18 wherein said inorganic oxide containing mesopores and a substantial amount of micropores contain 75 volume percent micropores.

20. A process for producing an inorganic oxide that contains mesopores, comprising:

heating a mixture comprising water, an inorganic oxide, and at least one compound that binds to the inorganic oxide by hydrogen bonding, to about the boiling point of water, whereby water is evaporated from said mixture, and said compound that binds to the inorganic oxide by hydrogen bonding is retained in said mixture; and heating said mixture to a temperature above the boiling point of water and up to the boiling point of said compound which binds to said inorganic oxide by hydrogen bonding, whereby said mesopores are formed in said inorganic oxide.

21. The process of claim 20 wherein said compound which binds to said inorganic oxide by hydrogen bonding has a boiling point of at least 150° C.

22. A product comprising:

a non-crystalline inorganic oxide, said inorganic oxide including micropores and mesopores, wherein said inorganic oxide has one peak in an X-ray diffraction pattern where 2θ between 0.5 and 2.5° and wherein said mesopores are interconnected mesopores.

23. The product of claim 22 wherein said mesopores have a wall-to-wall distance of from 3 nm to 25 nm.

24. The product of claim 22 wherein said inorganic oxide is a silicate.

25. The product of claim 22 wherein said mesopores have a diameter of from 2 to 25 nm.

26. The product of claim 22 wherein the BET surface area is from 50 to 1250 m$^2$/g.

27. The product of claim 22 wherein the pore size distribution of the mesopores produces a pore size distribution plot in which the ratio of the width of the plot at half the height of the plot to the pore size at the maximum height of the plot is no greater than 0.75.

28. A product, comprising:

a non-crystalline inorganic oxide, said inorganic oxide including mesopores, wherein said inorganic oxide has one peak in an X-ray diffraction pattern where 2θ is between 0.5 and 2.5° and wherein said mesopores are interconnected mesopores.

29. The product of claim 28 wherein said inorganic oxide has a BET surface area from 50 to 1,250 m$^2$/g.

30. The product of claim 28 wherein the pore size distribution of the mesopores produces a pore size distribution plot in which the ratio of the width of plot at half the height of the plot to the pore size at the maximum height of the plot is no greater than 0.75.

31. The product of claim 28 wherein said mesopores have a wall-to-wall distance of from 3 nm to 25 nm.

32. The product of claim 28 wherein said inorganic oxide is a silicate.

33. The product of claim 28 wherein said mesopores have a diameter of from 2 to 25nm.

* * * * *